(12) United States Patent
Lei

(10) Patent No.: US 7,058,238 B2
(45) Date of Patent: Jun. 6, 2006

(54) IMAGE PICK-UP APPARATUS AND IMAGE PICKING-UP METHOD

(75) Inventor: Huang Lei, Tokyo (JP)

(73) Assignee: NEC Corporation, Tokyo (JP)

( * ) Notice: Subject to any disclaimer, the term of this patent is extended or adjusted under 35 U.S.C. 154(b) by 463 days.

(21) Appl. No.: 09/740,954

(22) Filed: Dec. 21, 2000

(65) Prior Publication Data

US 2001/0005221 A1   Jun. 28, 2001

(30) Foreign Application Priority Data

Dec. 22, 1999 (JP) ................................ 11-363743

(51) Int. Cl.
*G06K 9/36* (2006.01)
(52) U.S. Cl. .................. 382/280; 348/222.1; 348/254; 382/124; 382/192; 382/218
(58) Field of Classification Search ........ 382/124–126, 382/192, 209, 217–218, 107, 165, 171, 173, 382/236, 275, 176; 348/169, 170, 571, 699, 348/700; 358/906, 909.1; 375/240.08, 240.17
See application file for complete search history.

(56) References Cited

U.S. PATENT DOCUMENTS

| | | | | |
|---|---|---|---|---|
| 4,872,203 | A | * | 10/1989 | Asai et al. ...................... 383/4 |
| 5,587,808 | A | * | 12/1996 | Hagihara et al. ............ 358/462 |
| 5,915,034 | A | * | 6/1999 | Nakajima et al. ............ 382/124 |
| 5,953,439 | A | * | 9/1999 | Ishihara et al. .............. 382/107 |
| 6,005,493 | A | * | 12/1999 | Taniguchi et al. .......... 340/990 |
| 6,023,522 | A | * | 2/2000 | Draganoff et al. .......... 382/124 |
| 6,075,876 | A | * | 6/2000 | Draganoff .................... 382/124 |
| 6,400,890 | B1 | * | 6/2002 | Nagasaka et al. ............. 386/69 |
| 6,442,203 | B1 | * | 8/2002 | Demos .................. 375/240.16 |
| 6,469,290 | B1 | * | 10/2002 | Suzuki .................... 250/208.1 |
| 6,483,932 | B1 | * | 11/2002 | Martinez et al. ............ 382/124 |
| 6,493,041 | B1 | * | 12/2002 | Hanko et al. ................ 348/699 |
| 6,535,254 | B1 | * | 3/2003 | Olsson et al. ................ 348/607 |
| 6,549,643 | B1 | * | 4/2003 | Toklu et al. ................. 382/107 |
| 6,560,366 | B1 | * | 5/2003 | Wilkins ....................... 382/236 |
| 6,567,550 | B1 | * | 5/2003 | Miyatake et al. ............ 382/190 |
| 6,650,362 | B1 | * | 11/2003 | Nakamura et al. ........ 348/222.1 |
| 6,756,996 | B1 | * | 6/2004 | Lippincott ................... 345/698 |

(Continued)

FOREIGN PATENT DOCUMENTS

JP          61-43379          3/1986

(Continued)

*Primary Examiner*—Matthew C. Bella
*Assistant Examiner*—Gregory Desire
(74) *Attorney, Agent, or Firm*—Sughrue Mion, PLLC

(57) ABSTRACT

A current frame portion (21) stores therein the most recent information of an image of those fingerprint images input from an inputted unit (1), while a previous frame portion (22) stores therein image information saved in the current frame portion (21). A pixel comparing portion (31) compares mutually corresponding pixel gray-level value information saved in the current frame portion (21) and the previous frame portion (22) respectively. A gray-level-value-changed pixels counting portion (32) counts the gray-level-value-increased pixels and the gray-level-value-decreased pixels based on the resultant information of that comparison of the pixel gray-level values. A pick-up timing deciding portion (33) utilizes the results obtained by the gray-level-value-changed pixels counting portion (32), to automatically detect a fingerprint image appropriate for matching in order to thus decide pick-up timing and also in order to output to an output unit (4) an appropriate fingerprint image based on the decision results.

12 Claims, 10 Drawing Sheets

U.S. PATENT DOCUMENTS 6,782,052 B1 * 8/2004 Sun et al. ............... 375/240.12
6,810,079 B1 * 10/2004 Itokawa ................. 375/240.08
2001/0005221 A1 * 6/2001 Huang ........................ 348/222

FOREIGN PATENT DOCUMENTS

| | | |
|---|---|---|
| JP | 61-145686 | 7/1986 |
| JP | 62-135982 | 6/1987 |
| JP | 63-21233 | 5/1988 |
| JP | 63-132386 | 6/1988 |
| JP | 4-252383 | 9/1992 |
| JP | 5-225345 | 9/1993 |
| JP | 6-20035 | 1/1994 |
| JP | 8-115425 | 5/1996 |
| JP | 9-274656 | 10/1997 |
| JP | 10-240913 | 9/1998 |

* cited by examiner

Fig.11
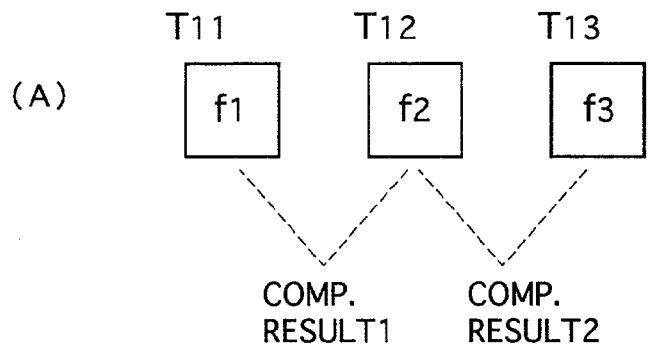
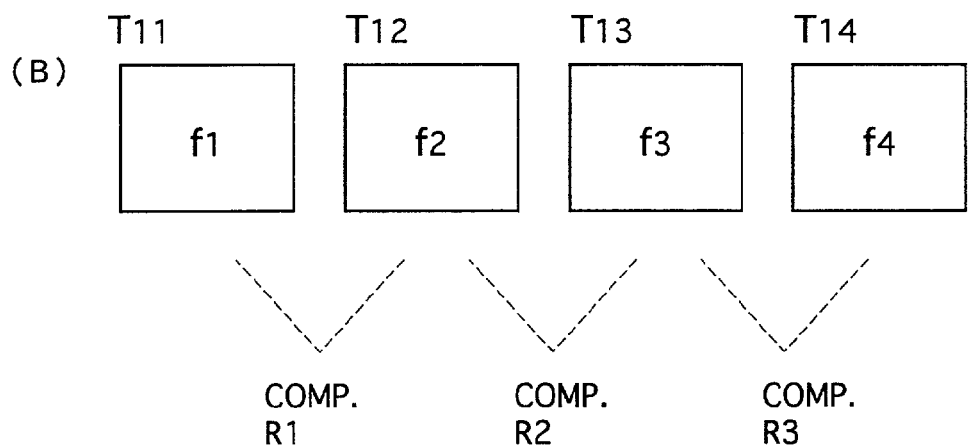
Fig.12
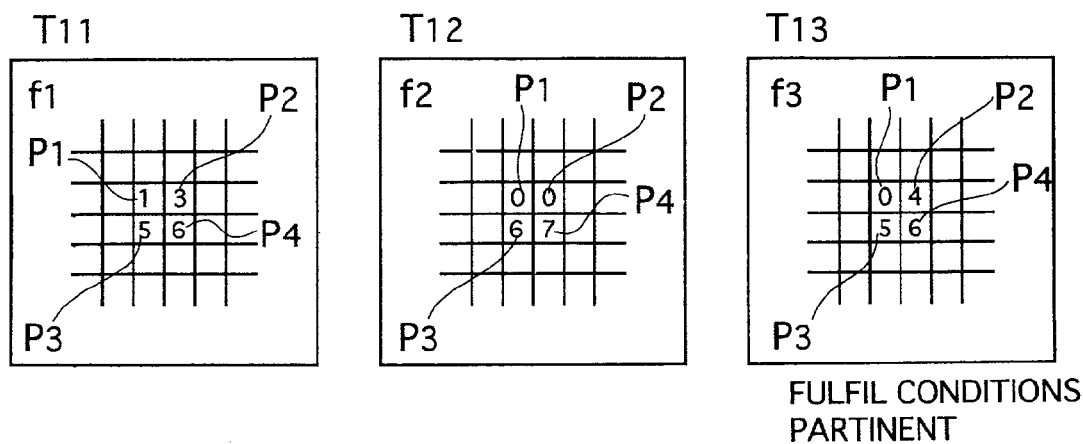
FULFIL CONDITIONS PARTINENT

IMAGE PICK-UP APPARATUS AND IMAGE PICKING-UP METHOD

BACKGROUND OF THE INVENTION

1. Field of the Invention

The invention relates to an image pick-up apparatus and a method for picking up an image and, more particularly, to an image pick-up apparatus which, when the finger etc., is put on a certain place, automatically picks up its skin marking pattern to provide a digital image.

2. Description of the Related Art

As a system for identifying an individual by his fingerprint there is available, an image matching apparatus that automatically checks an identity existing fingerprint information just input and a previously registered one, using image processing and pattern recognizing technologies. This type of the image matching apparatus has already been proposed in many cases such as in Japanese Examined Patent Publication (KOKOKU) No. 63-21233.

Conventionally, this type of the image matching apparatus has a fingerprint input unit for generating digital image of a fingerprint mark for the finger put on a loading surface made of a transparent body such as glass, provided with a light source, a Charge Coupled Device (CCD), etc., by utilizing the optical boundary conditions of glass with applying a light on the back face of that loading surface. Such a fingerprint input unit is disclosed in, for example, the Japanese Examined Patent Publication (KOKAI) No. 5-225345.

Also, there has recently been put to practical use such a device that is capable of a sensing approach to such finger print mark other than the optical one. This device senses irregularities such as convexed and concaved portions of a fingerprint put into directly contact with the surface of a semiconductor chip, for example, a type of detecting same with a static capacitance or a type of detecting same utilizing a difference in temperature or electric field.

In such a past fingerprint input unit, the image of a fingerprint thus input is liable to have a superiority fluctuation in picture quality caused by a fluctuation in the finger pressing state. Since this superiority fluctuation in picture quality greatly effects on the subsequent matching processing, it is desired to pick up an appropriate fingerprint image data from images picked up when the finger is pressed on that surface.

It is also desirable for user interface to, when picking up a fingerprint image information, automatically pick up an appropriate image without indicating the timing but only by putting the finger on the apparatus.

The conventional image pick-up apparatus has employed such a method that, to automatically pick up an appropriate images from the input unit for example, will extract an image when the apparatus decides the number of pixels thereof at existing a predetermined position of the image taken from the loading surface, each of which having a gray level value not less than a predetermined threshold of the gray level value Td is not less than a predetermined threshold number of pixels, Tn.

This method can automatically extract appropriate fingerprint images among the plurality of such images by using an appropriate threshold gray level value and an appropriate threshold number of pixels, when a distribution of the gray level value density within one fingerprint image is nearly uniform and a fluctuation in size of line pattern of the finger print is small within one fingerprint image.

This method, however, has such a problem that a fingerprint image cannot automatically be input because the number of pixels each having the respective gray level value exceeding over a predetermined gray level value is reduced when the gray level value of the pixels consisting a part of the image within the same fingerprint image data is caused to be reduced due to a scar or the like, or when the size of line pattern of the finger print of the fingerprint image data is narrow.

Conversely, in order to cope with this problems, when the threshold of the gray level value Td or the threshold number of pixels Tn is reduced, the number of pixels each having the gray level value exceeding over a predetermined threshold of the gray level value, becomes larger than a predetermined threshold number of pixels for such a fingerprint image that has a large width size of line pattern of the finger print pattern, even when the finger is not completely contacted with the plated, thus causing fingerprint images to be picked up before a sufficient picture quality is comes out.

Further in the conventional method, the threshold gray-level value used for detecting such a line pattern of the finger print, is fixed and thus when the line pattern of the finger print of a finger being contacted with a surface of a place on which the finger to be detected is mounted, is narrow, a number of pixels each having the gray-level value exceeding over a predetermined threshold gray-level value thereby even a fingerprint image which having clear image about the line pattern of the finger print, could not be selected automatically.

While, inversely, when the line pattern of the finger print of a finger to be detected is thick, a number of pixels each having the gray-level value exceeding over a predetermined threshold gray-level value, exceeds over a predetermined threshold value of the pixel numbers even when the finger to be detected did not completely come into contacted with the place on which the finger to be detected is mounted, thereby the fingerprint image could be selected before the quality of the fingerprint image becomes sufficient causing a problem in that a control for selecting such image information becomes difficult.

From these point of views, it is desired to provide a method of automatically picking up appropriate fingerprint images even when there are large fluctuations in the gray level value distribution or the size of line pattern of the finger print.

In addition to this, another object of the present invention is to provide an apparatus of and a method of automatically picking up appropriate fingerprint images having better quality thereof by analysing an inputting condition of a finger depending upon a chronological change information in a number of pixels the gray-level value of which being chronologically increased or decreased so as to resolve the above-mentioned drawbacks in the conventional apparatus.

SUMMARY OF THE INVENTION

In view of the above, it is an object of the invention to provide an image pick-up apparatus and an image pick-up method for solving the above-mentioned problems, to automatically pick up an image appropriate for fingerprint recognition from a fingerprint image input from the input unit, even with fluctuations in the gray level value distribution or in the size of line pattern of the finger print pattern.

The image pick-up apparatus of the invention picks up a plurality of images being chronologically arranged along time-series to provide a digital image, comprising, a means for obtaining information of changes in gray level value between those of the plurality of images thus picked up; and a means for deciding a timing at which at least one of the plurality of images is to be selectively extracted among those picked up images, based upon the results obtained by the changed image information obtaining means for using same in an image processing, later on.

On the other hand, in the present invention, an image pick-up method picks up a plurality of images being chronologically arranged along time-series to provide a digital image, comprising the steps of, obtaining information of changes in gray level value between those of the plurality of images thus picked up, and deciding a timing at which at least one of the plurality of images is to be selectively extracted among those picked up images, based upon the results obtained by the changed image information obtaining means for using same in an image processing, later on.

That is, in the present invention, an image picking up device such as an CCD camera or a static capacitance type image capturing device picks up a plurality of number of images for such fingerprint marks of a human finger successively and chronologically within about several seconds with a certain interval time for each one shot, respectively.

Further in the present invention, the plurality of images for the fingerprint are once tentatively stored into a plurality of memory means, respectively, and they are used for comparing with each other and processing to extract one image with considering which image among such plurality of images would be more pertinent one for using in identification process in that a decision whether or not the image currently obtained comply with an fingerprint image which had been registered into a certain memory is required.

Note that, therefore, in the present invention, the image pick-up apparatus of the invention selects one image of fingerprint out of a plurality of time-series images of fingerprint images which have been taken and stored temporarily in the memories, to utilize the information of changes in gray level value in these images, thus detecting images appropriate for matching.

More specifically, in the present invention, the changed image information obtaining means is configured so as to compare the gray level value of each one and same pixels of each one of the plurality of images with each other, and thereby obtaining a number of pixels in one of the image, the gray-level value of which are increased from those of one and same pixels of other image and a number of pixels in one of the image, the gray-level value of which are decreased from those of one and same pixels of other image.

By doing this, an appropriate image can be easily decided by using these data in a certain data processing means.

In the present invention, in doing the above-mentioned processing, the plurality number of images may be two images that are picked up by such camera means successively along the time series.

For example, one fingerprint image information picked up at a certain time and another fingerprint image information picked up at the next time to the time when the previous one had been picked up, are used.

In the more specific example of the present invention, the apparatus detects a timing at which an appropriate image should be extracted and captured among a plurality of images thus picked up, when the number of pixels in one of the image, the gray-level value of which are increased from those of one and same pixels of other image is less than the number of pixels in one of the image, the gray-level value of which are decreased from those of one and same pixels of other image.

Alternatively, the apparatus detects the same timing, when a difference between the number of pixels in one of the image, the gray-level value of which are increased from those of one and same pixels of other image and the number of pixels in one of the image, the gray-level value of which are decreased from those of one and same pixels of other images less than a predetermined threshold value of pixel numbers.

By doing this, even when there is observed a large fluctuation in the density distribution or in the size of line pattern of the finger print pattern within one fingerprint image, the apparatus can automatically decide and extract an appropriate fingerprint image.

BRIEF DESCRIPTION OF THE DRAWINGS

FIG. 11 shows an outlines of a comparison method carried out in the present invention among the fingerprint images; and FIG. 12 shows examples of the fingerprint images including each one of pixels having the respective gray-level value.

DESCRIPTION OF THE PREFERRED EMBODIMENTS

Figure 1:
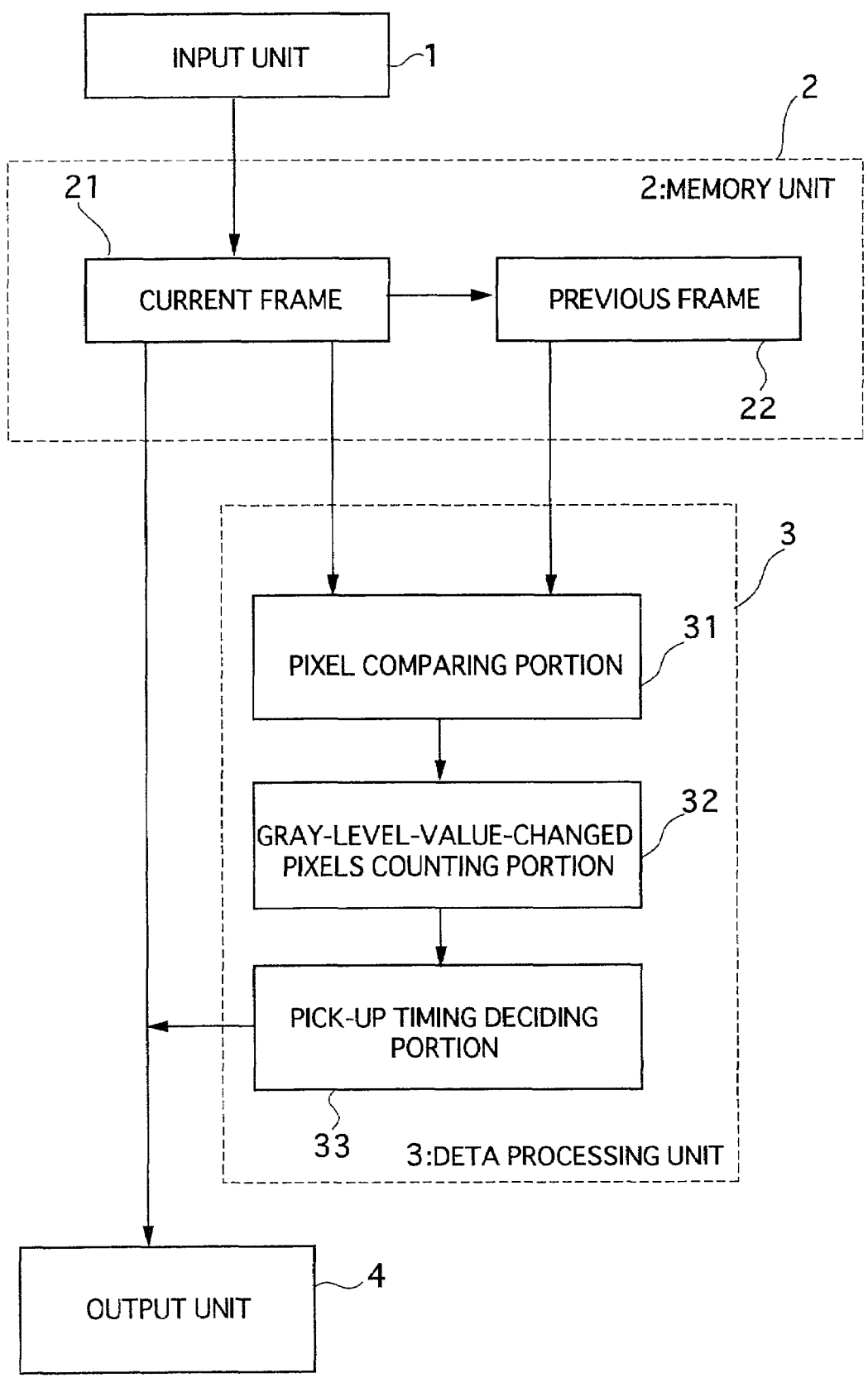
FIG. 1 is a block diagram showing a configuration of an image pick-up apparatus according to one embodiment of the invention.

The following will describe embodiments of the invention with reference to the drawings. FIG. 1 is a block diagram showing a configuration of an image pick-up apparatus according to one embodiment of the invention. As shown in FIG. 1, the image pick-up apparatus according to one embodiment of the invention comprises: an input unit 1 such as a sensor; a memory unit 2 for storing image information, a data processing unit 3 which operates under the control of programs; and an output unit 4 such as a fingerprint recognition device or a results display device.

The memory unit 2 comprises a current frame portion 21 and a previous frame portion 22. The current frame portion 21 stores therein information of the most recent image of fingerprint images input from the input unit 1. The previous frame portion 22 stores therein image information saved in the current frame portion 21 rather than more recent image information.

The data processing portion 3 comprises a pixel comparing portion 31, a gray-level-value-changed pixels counting portion 32, and a pick-up timing deciding portion 33. The pixel comparing portion 31 mutually compares a gray level value of one pixel of a certain position in an image data stored in the current frame portion memory 21, i.e., a first memory means, with a gray level value of one pixel of one and same position in an image data stored in the previous frame portion 22, i.e., a second memory means, respectively.

The gray-level-value-changed pixels counting portion 32 calculates the number of pixels the gray-level value of which are decreased and the number of pixels the gray-level value of which are increased based on the resultant information of the pixel gray-level-value comparison by the pixel comparing portion 31.

And then, the pick-up timing deciding portion 33 utilizes the results obtained at the gray-level-value-changed pixels counting portion 32, to automatically detect fingerprint images appropriate for matching and to decide the pick-up timing.

Also, the pick-up timing deciding portion 33 outputs appropriate fingerprint images to the output unit 4, based on the decision results.

Figure 2:
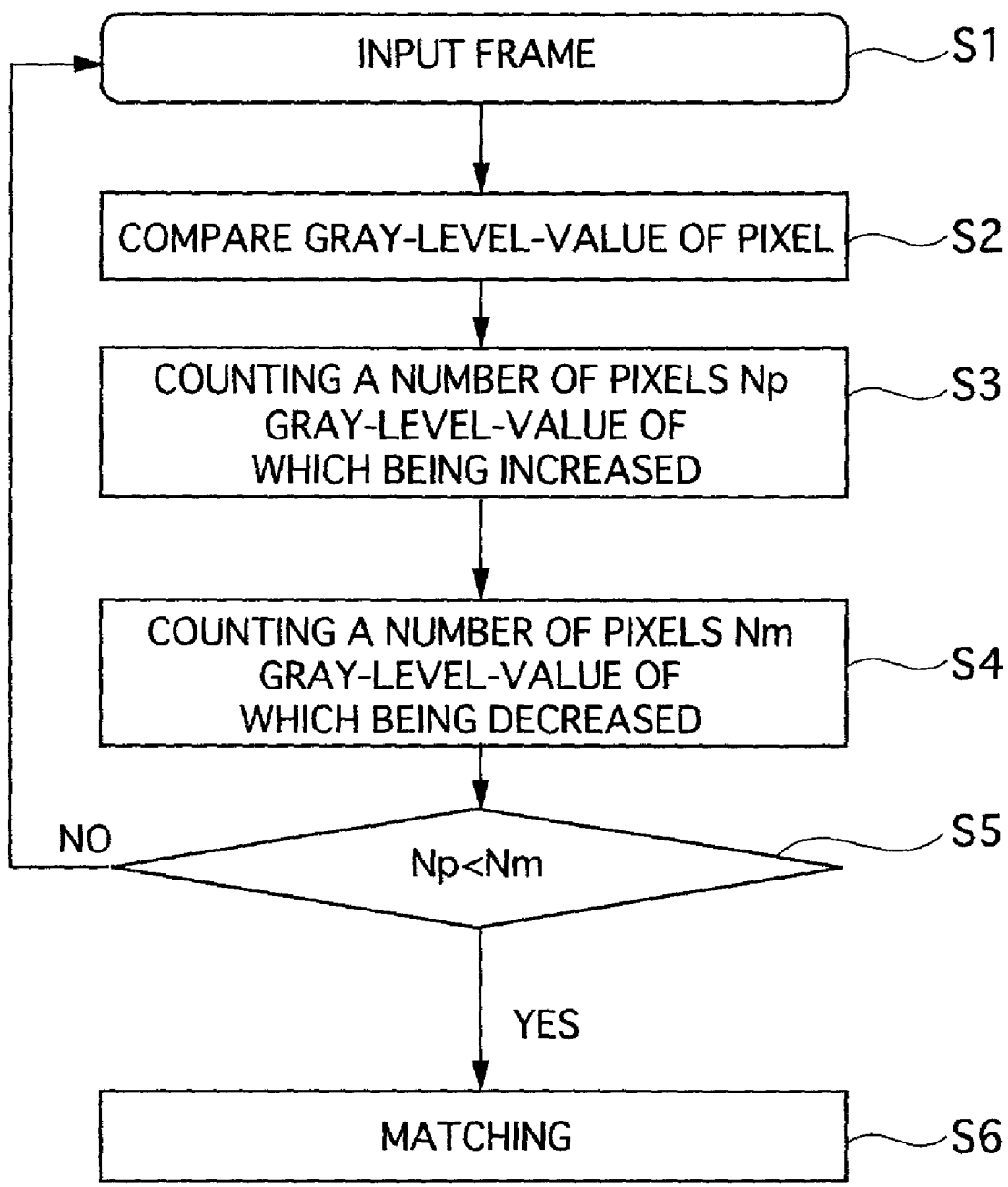
FIG. 2 is a flowchart showing operations of the same image pick-up apparatus according to the same embodiment of the invention.

FIG. 2 is a flowchart showing operations of the image pick-up apparatus according to one embodiment of the invention. The following will describe in details the operations of this one embodiment of the invention with reference to FIGS. 1 and 2.

Note here that the processes shown in FIG. 2 are implemented when the image pick-up apparatus according to this one embodiment of the invention executes programs saved in a control memory not shown, which may come in a ROM (Read Only Memory), an IC (Integrated Circuits) memory, etc.

When the finger is put on a transparent loading surface (not shown) made of glass etc., digital fingerprint images can be obtained by the input unit 1.

The digital fingerprint images thus obtained at the input unit 1 are stored in the current frame portion 21 of the memory unit 2. This causes image information stored previously in the current frame portion 21 to be copied to the previous frame portion 22 (step S1 in FIG. 2).

The pixel comparing portion 31 of the data processing is input both image information stored in both current frame portion 21 and previous frame portion 22 and compares mutually each of gray level value of one and same pixels of both image information, respectively (step S2 in FIG. 2).

The gray-level-value-changed pixels counting portion 32 calculates the number of pixels the gray-level value of which are increased Np and the number of pixels the gray-level value of which are decreased Nm, based on the resultant information of the pixel gray-level-value comparison means 31 (steps S3 and S4 in FIG. 2 respectively).

The pick-up timing deciding portion 33 compares the number of pixels the gray-level value of which are increased Np and the number of pixels the gray-level value of which are decreased Nm to each other (step S5 in FIG. 2), and then if that the number of pixels the gray-level value of which are increased Np is less than that the number of pixels the gray-level value of which are decreased Nm (Np<Nm), it decides the relevant image information is appropriate, so that it outputs the image information stored in the previous frame portion 22 to the output unit 4 for matching at this timing (step S6 in FIG. 2).

On the other hand, when the number of pixels the gray-level value of which are increased Np is not less than the number of pixels the gray-level value of which are decreased Nm (Np≧Nm), the pick-up timing deciding portion 33 decides that the timing for extract an image information is inappropriate, to return to the step of inputting the next frame (step S1 in FIG. 2).

Figure 3:
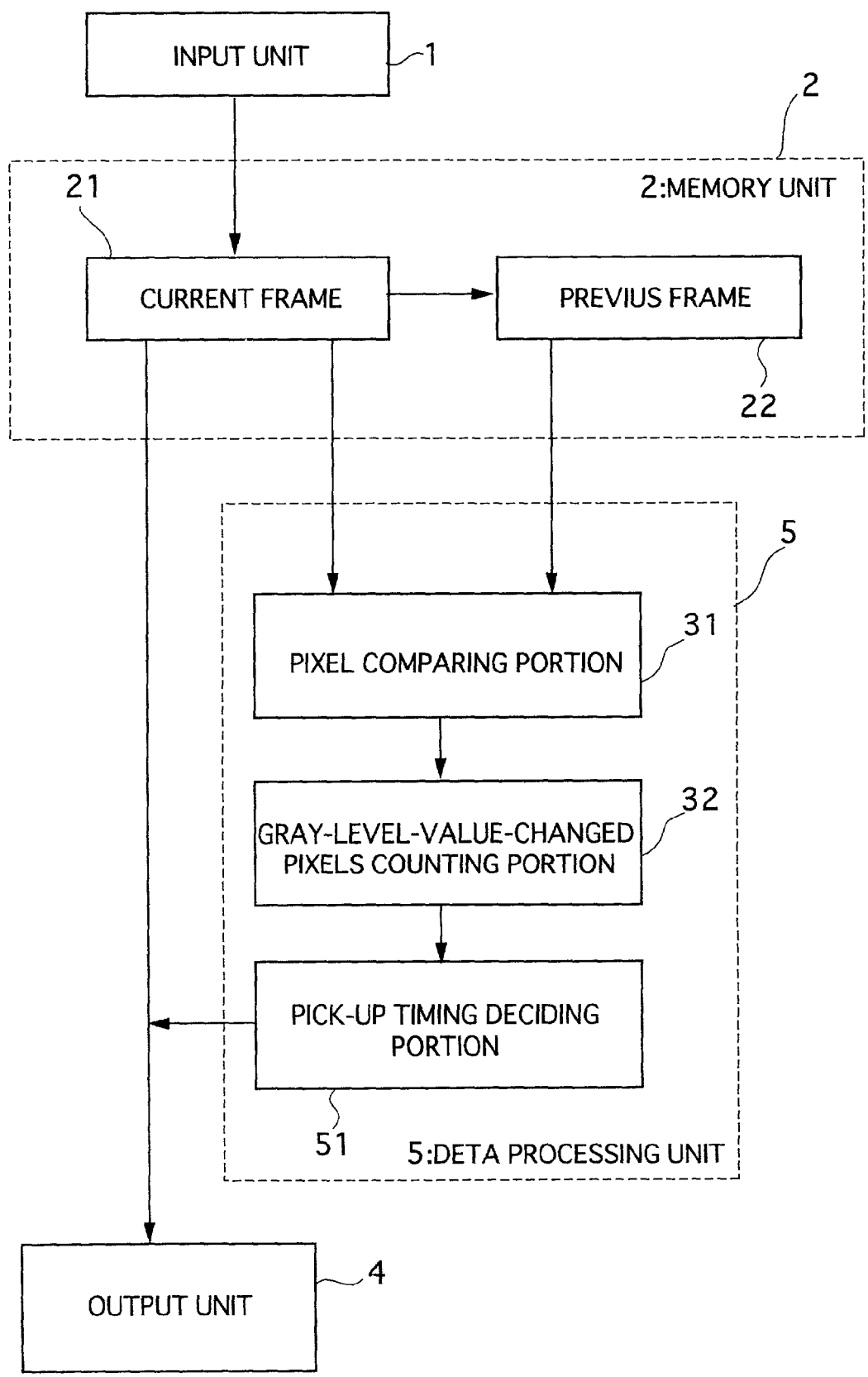
FIG. 3 is a block diagram showing a configuration of an image pick-up apparatus according to another embodiment of the invention.

FIG. 3 is a block diagram showing a configuration of an image pick-up apparatus according to another embodiment of the invention. As shown in FIG. 3, this image pick-up apparatus of this another embodiment of the invention has the same configuration as that of the first embodiment shown in FIG. 1 except for the operations of a pick-up timing deciding portion 51 in a data processing unit 5, in which figures, the same elements are indicated by the same reference numerals. Also, the elements of the same reference numeral operate in the same manner in the first and this embodiments.

This image pick-up apparatus to this another embodiment of the invention, like that according to the first embodiment of the invention, comprises: the input unit 1 such as a fingerprint sensor etc.; the memory unit 2 for storing image information; the data processing unit 5 which operates under the control of programs; and the output unit 4 such as a fingerprint recognition apparatus or a results display.

The memory unit 2 comprises the current frame portion 21 and the previous frame portion 22. The current frame portion 21 stores therein the most recent image information of fingerprint images input from the input unit 1. The previous frame portion 22 stores therein image information once stored saved in the current frame portion 21 rather than more recent image information.

The data processing portion 5 comprises a pixel comparing portion 31, the gray-level-value-changed pixels counting portion 32, and a pick-up timing deciding portion 51. The pixel comparing portion 31 compares mutually each of gray level value of one and same pixels of both image information, respectively.

The gray-level-value-changed pixels counting portion 32 calculates the number of pixels the gray-level value of which are decreased and the number of pixels the gray-level value of which are increased based on the resultant information of the pixel gray-level-value comparison by the pixel comparing portion 31.

And then, the pick-up timing deciding portion 51 utilizes the results obtained at the gray-level-value-changed pixels counting portion 32, to automatically detect fingerprint images appropriate for matching and to decide the pick-up timing.

Also, the pick-up timing deciding portion 51 outputs appropriate fingerprint images to the output unit 4, based on the decision results.

Figure 4:
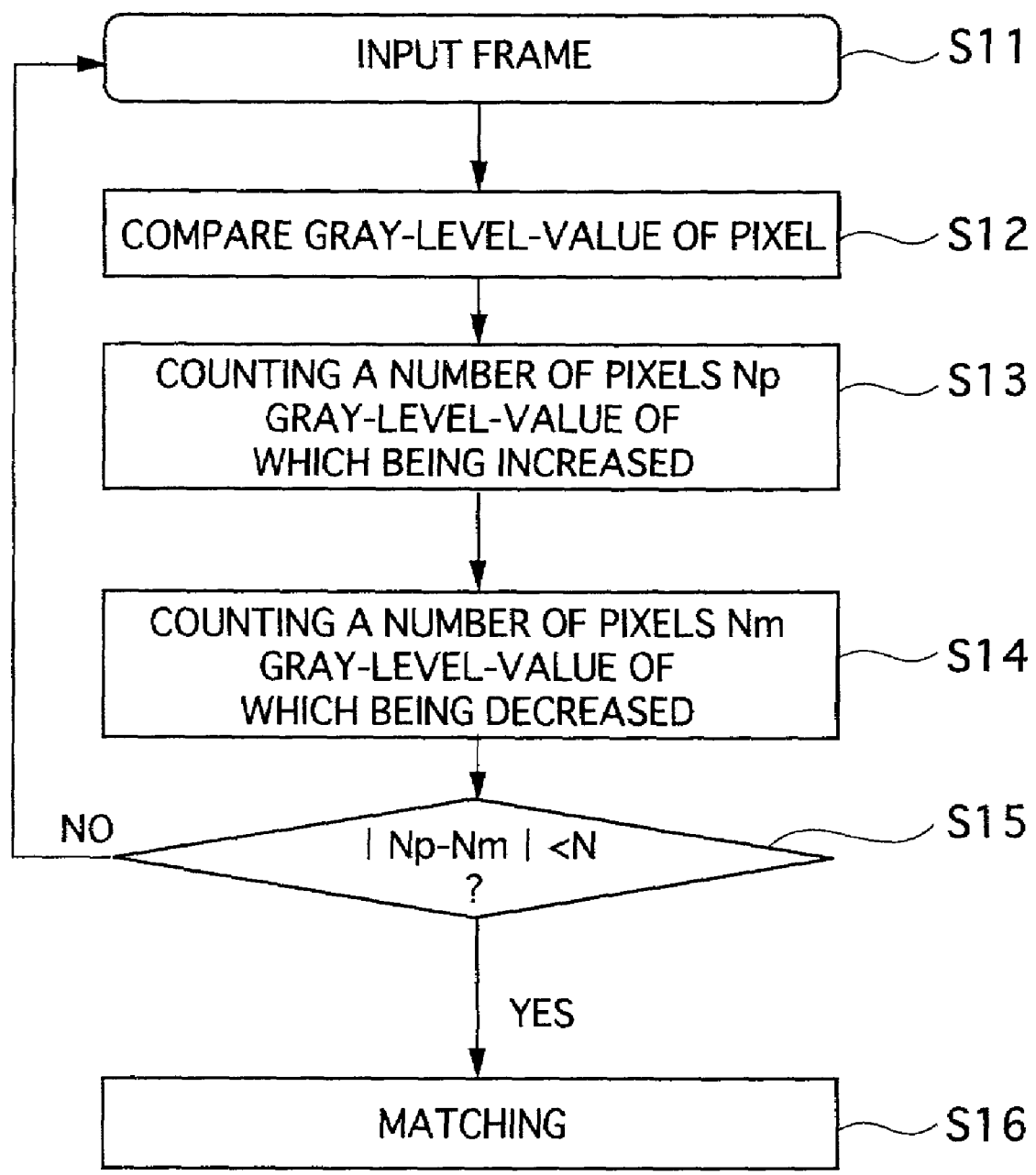
FIG. 4 is a flowchart showing operations of the same image pick-up apparatus according to another embodiment of the invention.

FIG. 4 is a flowchart showing operations of the same image pick-up apparatus according to another embodiment of the invention. With reference to FIGS. 3 and 4 the following will describe in details the operations of this image pick-up apparatus according to this another embodiment of the invention. Note here that that the processes shown in FIG. 4 are implemented when the image pick-up apparatus according to this one embodiment of the invention executes programs saved in a control memory not shown, which may come in a ROM (Read Only Memory), an IC (Integrated Circuits) memory, etc.

When the finger is put on a transparent loading surface (not shown) made of glass etc., digital fingerprint images can be obtained by the input unit 1. The digital fingerprint images thus obtained at the input unit 1 are stored in the current frame portion 21 of the memory unit 2. This causes image information stored previously in the current frame portion 21 to be copied to the previous frame portion 22 (step S11 in FIG. 4).

The pixel comparing portion 31 of the data processing 5 is input both image information stored in both current frame portion 21 and previous frame portion 22 and compares mutually each of gray level value of one and same pixels of both image information, respectively (step S12 in FIG. 4).

The gray-level-value-changed pixels counting portion 32 calculates the number of pixels the gray-level value of which are increased Np and the number of pixels the gray-level value of which are decreased Nm, based on the resultant information of the pixel gray-level-value comparison means 31(steps S13 and S14 in FIG. 4 respectively).

The pick-up timing deciding portion 51 compares the number of pixels the gray-level value of which are increased Np and the number of pixels the gray-level value of which are decreased Nm to each other (step S15 in FIG. 4), and then if when an absolute value of a difference between the number of pixels the gray-level value of which are increased Np and the number of pixels the gray-level value of which are decreased Nm is less than a predetermined threshold value N, (|Np−Nm|<N), it decides the relevant image information is appropriate, so that it outputs the image information stored in the previous frame portion 22 to the output unit 4 for matching at this timing (step S16 in FIG. 4).

On the other hand, if when an absolute value of a difference between the number of pixels the gray-level value of which are increased Np and the number of pixels the gray-level value of which are decreased Nm is less than a predetermined threshold value N, (|Np−Nm|<N), the pick-up timing deciding portion 51 decides that the timing for extract an image information is inappropriate, to return to the step of inputting the next frame (step S11 in FIG. 4).

Figure 5:
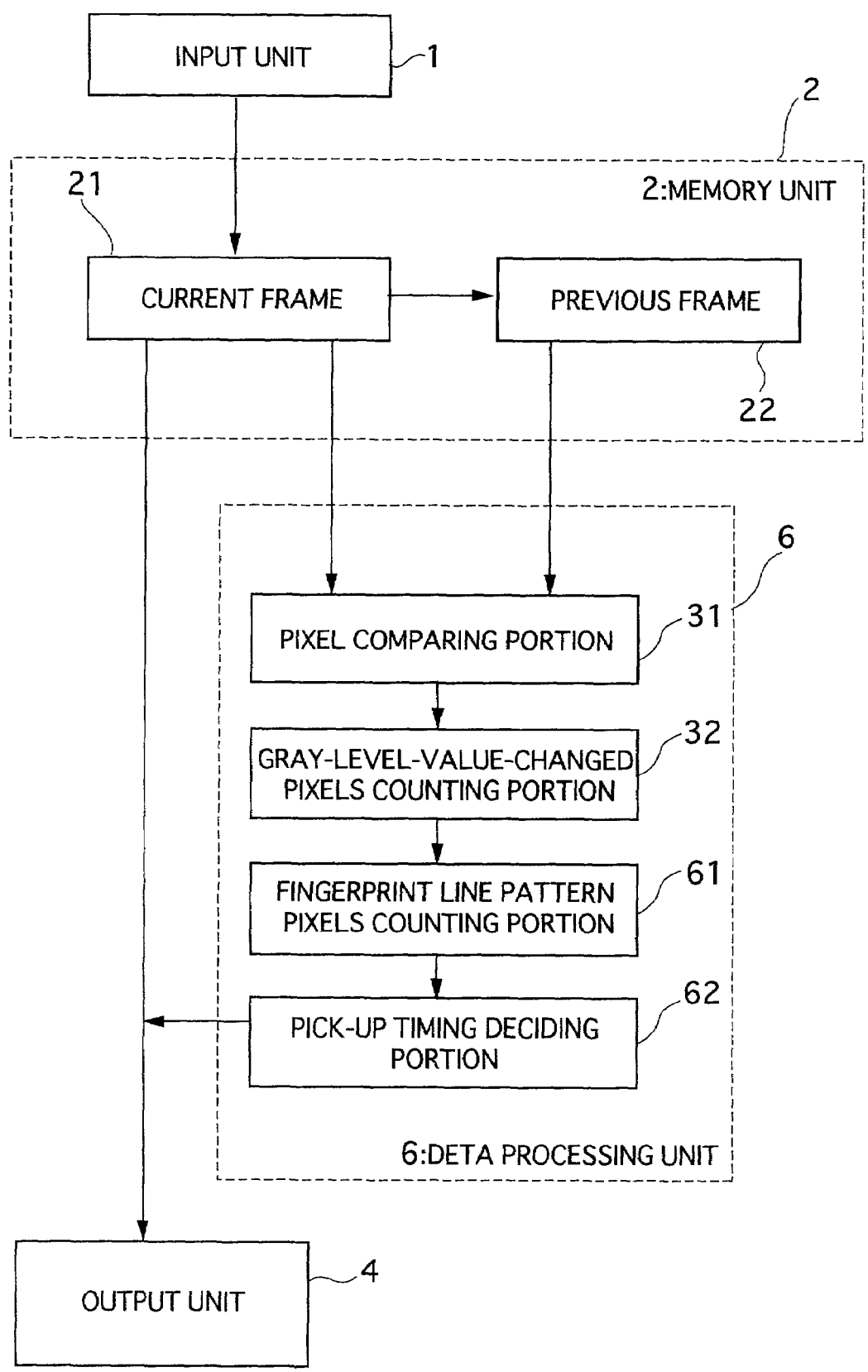
FIG. 5 is a block diagram showing a configuration of an image pick-up apparatus according to further another embodiment of the invention.

FIG. 5 is a block diagram showing a configuration of an image pick-up apparatus according to further another embodiment of the invention. As shown in FIG. 5, this image pick-up apparatus of this further another embodiment of the invention has the same configuration as that of the first embodiment shown in FIG. 1 except that in the image pick-up apparatus according to this further another embodiment of the invention, a data processing unit 6 has therein a line pattern of the finger print pixel counting portion 61, and a pick-up timing deciding portion 62, in which figures, the same elements are indicated by the same reference numerals. Also, the elements of the same reference numeral operate in the same manner in the first and this embodiments.

This image pick-up apparatus to this further another embodiment of the invention, like that according to the first embodiment of the invention, comprises: the input unit 1 such as a fingerprint sensor or the like, the memory unit 2 for storing image information; the data processing unit 6 which operates under the control of programs; and the output unit 4 such as a fingerprint recognition apparatus or a results display.

The memory unit 2 comprises the current frame portion 21 and the previous frame portion 22. The current frame portion 21 stores therein the most recent image information of fingerprint images input from the input unit 1. The previous frame portion 22 stores therein image information saved in the current frame portion 21 rather than more recent image information.

The data processing portion 6 comprises the pixel comparing portion 31, the gray-level-value-changed pixels counting portion 32, a line pattern of the finger pixels counting portion 61, and a pick-up timing deciding portion 62. The pixel comparing portion 31 compares mutually corresponding pixel gray-level information pieces stored in the current frame portion 21 and the previous frame portion 22 respectively.

The gray-level-value-changed pixels counting portion 32 calculates the number of pixels the gray-level value of which are decreased and the number of pixels the gray-level value of which are increased based on the resultant information of the pixel gray-level-value comparison by the pixel comparing portion 31.

The finger print line pattern pixel counting means 61 calculates the number of the pixels each having a gray level value exceeding over a predetermined threshold of gray level value in the image information as stored in the current frame portion 21.

The image pick-up timing deciding portion 62 utilizes the results obtained at the gray-level-value-changed pixels counting portion 32 and the finger print line pattern pixel counting means 61, to automatically detect fingerprint images appropriate for matching, so as to decide the pick-up timing. Also, the pick-up timing deciding portion 62 outputs appropriate fingerprint images to the output unit 4 based on the decision results.

Figure 6:
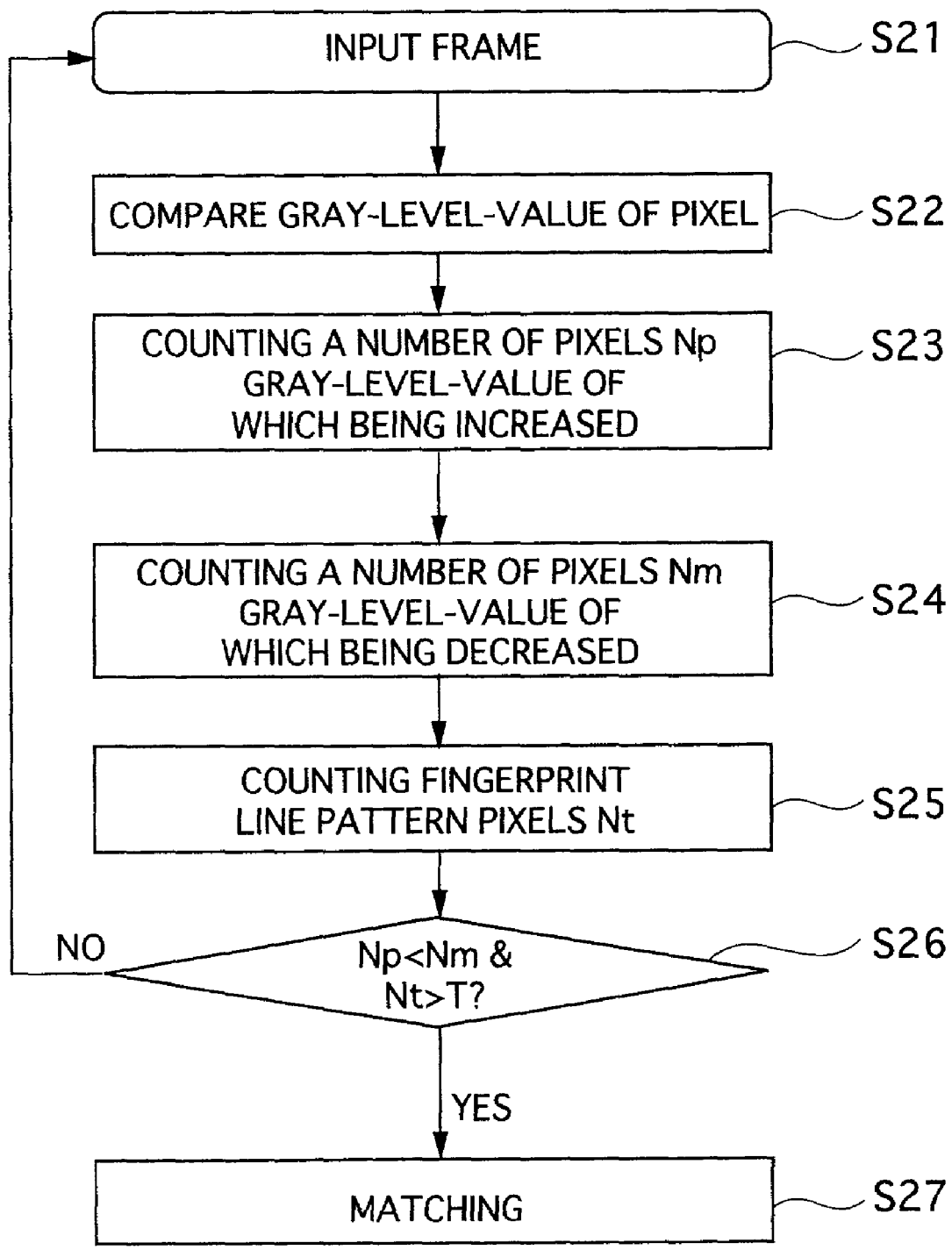
FIG. 6 is a flowchart showing operations of the same image pick-up apparatus according to further another embodiment of the invention.

FIG. 6 is a flowchart showing operations of the same image pick-up apparatus according to further another embodiment of the invention. With reference to FIGS. 5 and 6 the following will describe in details the operations of this image pick-up apparatus according to this another embodiment of the invention. Note here that that the processes shown in FIG. 6 are implemented when the image pick-up apparatus according to this one embodiment of the invention executes programs saved in a control memory not shown, which may come in a ROM (Read Only Memory), an IC (Integrated Circuits) memory, etc.

When the finger is put on a transparent loading surface (not shown) made of glass etc., digital fingerprint images can be obtained by the input unit 1. The digital fingerprint images thus obtained at the input unit 1 are stored in the current frame portion 21 of the memory unit 2. This causes image information stored previously in the current frame portion 21 to be copied to the previous frame portion 22 (step S21 in FIG. 6).

The pixel comparing portion 31 of the data processing 6 is input both image information stored in both current frame portion 21 and previous frame portion 22 and compares mutually each of gray level value of one and same pixels of both image information, respectively (step S22 in FIG. 6).

The gray-level-value-changed pixels counting portion 32 calculates the number of pixels the gray-level value of which are increased Np and the number of pixels the gray-level value of which are decreased Nm, based on the resultant information of the pixel gray-level-value comparison means 31(steps S23 and S24 in FIG. 6 respectively).

The finger print line pattern pixel counting means 61 is input the image information as stored in the current frame portion 21 and compares the gray level value of each one of the pixels of the image information with a predetermined threshold value t of the gray level value so as to count the number of the pixels Nt the gray level value of which exceeding over the predetermined threshold value t of the gray level value (step S25 in FIG. 6).

The pick-up timing deciding portion 62 is input the number of pixels the gray-level value of which are increased Np and the number of pixels the gray-level value of which are decreased Nm, respectively so as to compare with each other (step S26 in FIG. 6). Then, The pick-up timing deciding portion 62 decides that the information of the relevant image is appropriate, when the number of pixels the gray-level value of which are increased Np is less than the number of pixels the gray-level value of which are decreased Nm (Np<Nm) and also when the number of the pixels Nt the gray level value of which exceeding over the predetermined threshold value t of the gray level value, is larger than a predetermined threshold value of the pixel number T(Nt>T), and outputs the image information saved in the current frame 21 to the output 4 for matching (step S27 in FIG. 6).

On the other hand, when the number of pixels the gray-level value of which are increased Np is not less than the number of pixels the gray-level value of which are decreased Nm (Np≧Nm) or when the number of the pixels Nt the gray level value of which exceeding over the predetermined threshold value t of the gray level value, is not larger than a predetermined threshold value of the pixel number T(Nt≦T), the pick-up timing deciding portion 62 decides that the timing for extract an image information is inappropriate, to return to the step of inputting the next frame (step S21 in FIG. 6).

Figure 7:
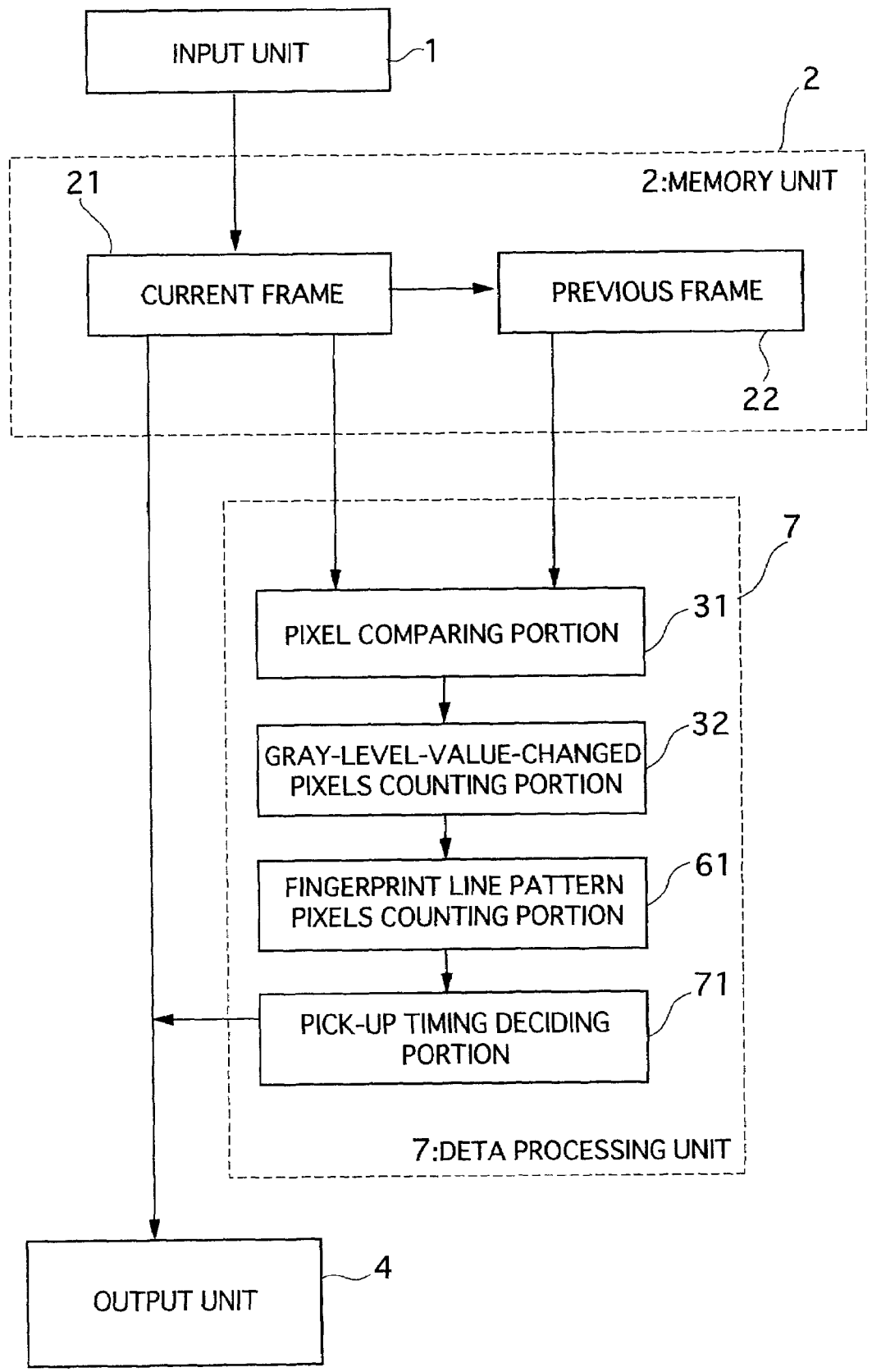
FIG. 7 is a block diagram showing a configuration of an image pick-up apparatus according to still further another embodiment of the invention.

FIG. 7 is a block diagram showing a configuration of an image pick-up apparatus according to still further another embodiment of the invention. As shown in FIG. 7, this image pick-up apparatus of this still further another embodiment of the invention has the same configuration as that of the another embodiment shown in FIG. 5 except for the operations of a pick-up timing deciding portion 71 in a data processing unit 7, in which figures, the same elements are indicated by the same reference numerals. Also, the elements of the same reference numeral operate in the same manner in the another and this embodiments.

This image pick-up apparatus to this still further another embodiment of the invention, like that according to the another embodiment of the invention, comprises: the input unit 1 such as a fingerprint sensor etc.; the memory unit 2 for storing image information; the data processing unit 7 which operates under the control of programs; and the output unit 4 such as a fingerprint recognition apparatus or a results display.

The memory unit 2 comprises the current frame portion 21 and the previous frame portion 22. The current frame portion 21 stores therein the most recent image information of fingerprint images input from the input unit 1. The previous frame portion 22 stores therein image information saved in the current frame portion 21 rather than more recent image information.

The data processing portion 7 comprises the pixel comparing portion 31, the gray-level-value-changed pixels counting portion 32, the line pattern of the finger print pixels counting portion 61, and the pick-up timing deciding portion 71. The pixel comparing portion 31 compares mutually corresponding pixel gray-level information pieces stored in the current frame portion 21 and the previous frame portion 22 respectively.

The gray-level-value-changed pixels counting portion 32 determines by counting the number of pixels the gray-level value of which are increased and the number of pixels the gray-level value of which are decreased, based on the resultant information of the pixel gray-level-value comparison by the pixel comparing portion 31. The finger print line pattern pixels counting portion 61 determines by counting the number of the pixels that has a larger gray level value than a predetermined threshold gray level value included in the image information saved in the current frame portion 21.

The pick-up timing deciding portion 71 utilizes the results obtained at the gray-level-value-changed pixels counting portion 32 and the line pattern of the finger print pixels counting portion 61, to automatically detect fingerprint images appropriate for matching, thus deciding pick-up timing. Also, the pickup timing deciding portion 71 outputs appropriate fingerprint images to the output unit 4 based on the decision results.

Figure 8:
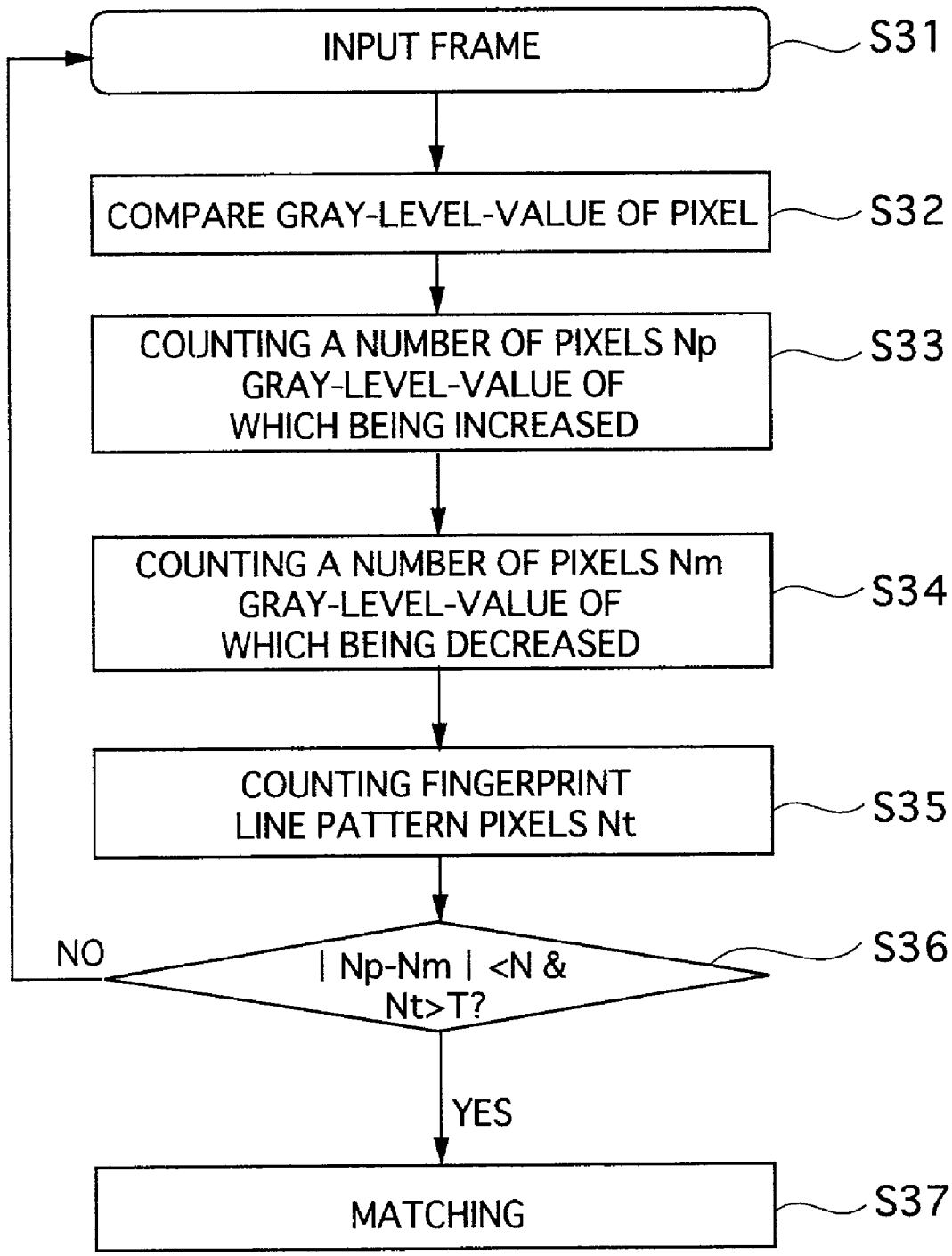
FIG. 8 is a flowchart showing operations of the same image pick-up apparatus according to still further another embodiment of the invention.

FIG. 8 is a flowchart showing operations of the same image pick-up apparatus according to still further another embodiment of the invention. With reference to FIGS. 7 and 8 the following will describe in details the operations of this image pick-up apparatus according to this still further another embodiment of the invention. Note here that that the processes shown in FIG. 8 are implemented when the image pick-up apparatus according to this still further another embodiment of the invention executes programs saved in a control memory not shown, which may come in a ROM (Read Only Memory), an IC (Integrated Circuits) memory, etc.

When the finger is put on a transparent loading surface (not shown) made of glass etc., digital fingerprint images can be obtained by the input unit 1. The digital fingerprint images thus obtained at the input unit 1 are stored in the current frame portion 21 of the memory unit 2. This causes image information stored previously in the current frame portion 21 to be copied to the previous frame portion 22 (step S31 in FIG. 8).

The pixel comparing portion 31 of the data processing unit 7 receives as an input image information saved in the current frame portion 21 and that saved in the previous frame portion 22, to compare pixels, with each other, corresponding to each of these two images (step S32 in FIG. 8).

The gray-level-value-changed pixels counting portion 32 calculates the number of pixels the gray-level value of which are increased Np and the number of pixels the gray-level value of which are decreased Nm, based on the resultant information of the pixel gray-level-value comparison means 31 (steps S33 and S34 in FIG. 8 respectively).

The finger print line pattern pixel counting means 61 is input the image information as stored in the current frame portion 21 and compares the gray level value of each one of the pixels of the image information with a predetermined threshold value t of the gray level value so as to count the number of the pixels Nt the gray level value of which exceeding over the predetermined threshold value t of the gray level value (step S35 in FIG. 8).

The pick-up timing deciding portion 71 is input the number of pixels the gray-level value of which are increased Np and the number of pixels the gray-level value of which are decreased Nm so as to compare with a predetermined threshold value N (step S36 in FIG. 8).

The pick-up timing deciding portion 71 decides that the information of the relevant image is appropriate, when an absolute value of a difference between the number of pixels the gray-level value of which are increased Np and the number of pixels the gray-level value of which are decreased Nm is less than a predetermined threshold value N, (|Np−Nm|<N) as well as when the number of the pixels Nt the gray level value of which exceeding over the predetermined threshold value t of the gray level value, is larger than a predetermined threshold value of the pixel number T (Nt>T), and outputs the image information stored either one of the current frame 21 or the previous frame 22 to the output 4 for matching (step S37 in FIG. 8).

On the other hand, if when an absolute value of a difference between the number of pixels the gray-level value of which are increased Np and the number of pixels the gray-level value of which are decreased Nm is not less than a predetermined threshold value N, (|Np−Nm|≧N) or when the number of the pixels Nt the gray level value of which exceeding over the predetermined threshold value t of the gray level value, is not larger than a predetermined threshold value of the pixel number T (Nt≦T), the pick-up timing deciding portion 71 decides that the timing for extract an image information is inappropriate, to return to the step of inputting the next frame (step S31 in FIG. 8).

Thus, by utilizing information of a plurality of time-series images, appropriate fingerprint images can be automatically detected and picked up even when there are large fluctuations in the gray-level distribution within one fingerprint image or in the size of fingerprint rising-line patterns. With this, it is possible to solve the problems which have been impossible to solve by the prior art technologies.

Hereafter, the basic technical conception of the present invention will be explained more precisely.

Figure 9:
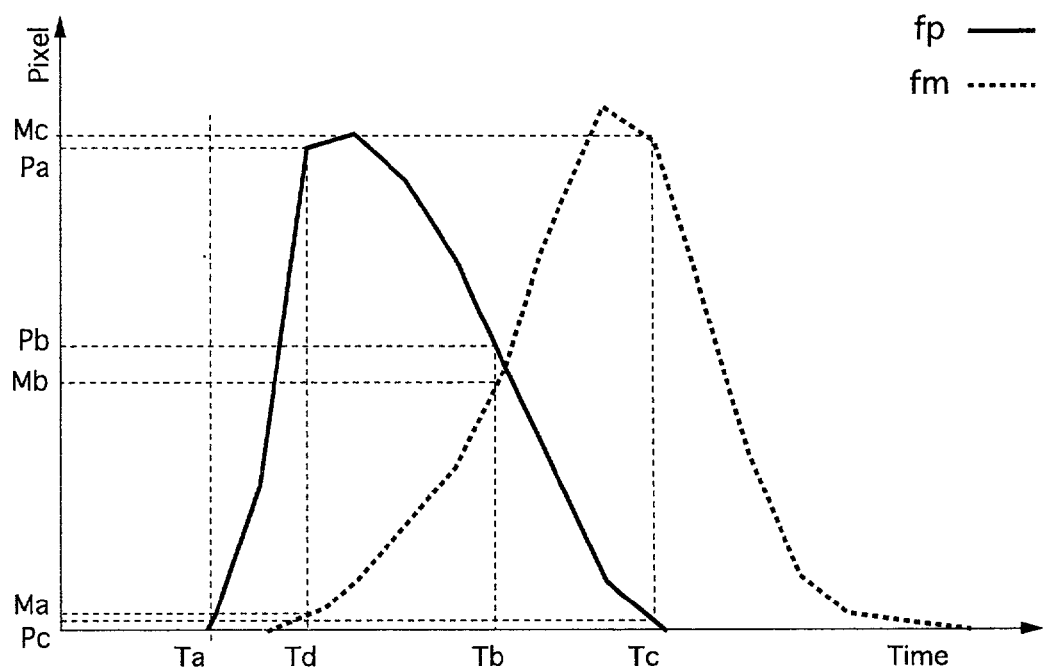
FIG. 9 is a graph showing a relationship between a chronological change in the number of pixels, a gray-level value of which are increased and a chronological change in the number of pixels, a gray-level value of which are decreased.

Note that FIG. 9 shows chronological change in a number of pixels each having the respective gray-level value exceeding over a certain threshold value displayed on an image to be detected on a way of inputting fingerprint pattern performed with an actual human finger and in the FIG. 9, each graph shows respectively the number of pixels arranged in a prescribed position in the image and a gray-level value of which are increased or decreased from that of pixels arranged in one and same position in the same image but taken immediately before the former image had been taken.

In FIG. 9, the ordinate denotes a number of the pixels and the abscissa denotes time elapsed.

While in that, the graph fp denotes a chronological change in the number of pixels arranged in a prescribed position in a current image and a gray-level value of which are exceeding over the gray-level value of the respective pixels arranged in one and same position in a previous image but taken immediately before the current image had been taken, and the graph fm denotes a chronological change in the number of pixels arranged in a prescribed position in a current image and a gray-level value of which are below the gray-level value of the respective pixels arranged in one and same position in a previous image but taken immediately before the current image had been taken.

Note that, the fingerprint pattern inputting process utilizing a finger of a real human being will start first to put a part of skin of the finger into contacted with a surface of finger mounting plate of a fingerprint inputting apparatus and then the contacting area of the finger with the finger mounting plate will be gradually increased and simultaneously a contacting pressure to the finger mounting plate caused by the finger will also be increased.

With the increment of the pressure to the finger mounting plate caused by the finger, a gray-level value of the line pattern of the finger print in the image showing the contacting portion of the finger is also increased and thus the fingerprint pattern showing the contacting portion of the finger in the input image becomes gradually clear.

When the finger mounting operation to the finger mounting plate has been completed, the contacting area formed between the finger and the finger mounting plate becomes relatively stable reducing an average pressure caused by the finger being pressed to the finger mounting plate to be relatively stable, accordingly.

However, it is very difficult for a human being to keep the pressure applied to all of the contacting position formed between the finger and the contacting portions of the finger mounting plate stable for a prescribed time.

Note that even when the averaged pressure applied to all of the position n the contacting surface are seemed to be stable, the pressure applied to the respective local positions in the contacting surface is usually changed.

Therefore, the gray-level value of the local position in the fingerprint image are also always changed.

But, when the above-mentioned finger mounting condition to the finger mounting plate is stable, since the averaged pressure caused by the finger being pressed to the finger mounting plate is relatively stable, the number of pixels of the current image and, a gray-level value of which are increased from the gray-level value of the previous image taken immediately before the current image had been taken and the number of pixels of the current image and, a gray-level value of which are decreased from the gray-level value of the previous image taken immediately before the current image had been taken are relatively identical to each other.

As shown by FIG. 9, at the time Ta, the contacting operation by the finger to the finger mounting plate is started and between the time Ta and the time Ta', the pressure caused by the finger contacting to the finger mounting plate is gradually increased.

Under this situation, a difference formed between the number of pixels Pa of the current image and a gray-level value of which are increased from the gray-level value of the previous image taken immediately before the current image had been taken and the number of pixels Ma of the current image and a gray-level value of which are decreased from the gray-level value of the previous image taken immediately before the current image had been taken is significantly large. After that, at the time Tb, since the finger mounting operation has substantially been completed, the averaged pressure caused by the finger being pressed to the finger mounting plate becomes relatively stable.

Under this situation, a difference formed between the number of pixels Pa the gray-level value of which are increased and the number of pixels Ma the gray-level value of which are decreased, is relatively small.

Then, at the time Tc, the finger is removing from the finger mounting plate and accordingly the pressure caused by the finger pressing the finger mounting plate is started to be also decreased.

Under this situation, a difference formed between the number of pixels Pa the gray-level value of which are increased and the number of pixels Ma the gray-level value of which are decreased, is relatively large.

The automatical fingerprint image capturing method of the present invention utilizes the characteristic of the fact in that when the finger is stably mounted on a surface of the finger mounting plate, a difference formed between the number of pixels Pa of the current image and a gray-level value of which are increased from the gray-level value of the previous image taken immediately before the current image had been taken and the number of pixels Ma of the current image and a gray-level value of which are decreased from the gray-level value of the previous image taken immediately before the current image had been taken is relatively small.

However, in the present invention, only this technical conception was not sufficient to realize the object of the present invention.

The reasons therefor will be explained hereunder with reference to the FIG. 10.

Figure 10:
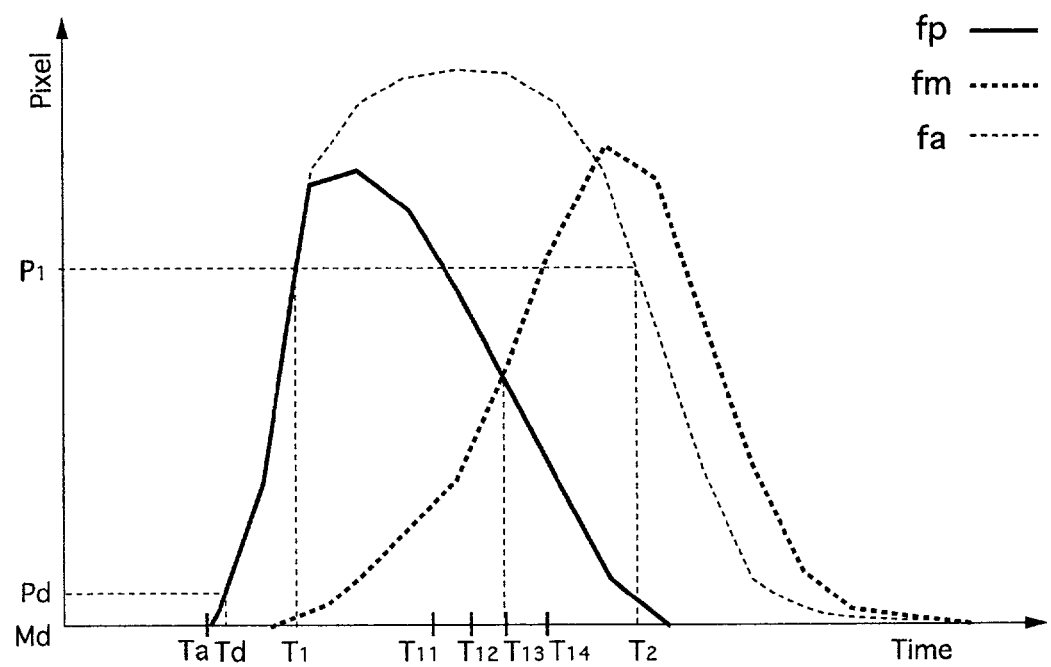
FIG. 10 is a graph showing a relationship between a chronological change in the number of pixels, a gray-level value of which are increased and a chronological change in the number of pixels, a gray-level value of which are decreased as well as a contacting area formed between the finger and the finger mounting plate.

In FIG. 10, the ordinate denotes a number of the pixels and the abscissa denotes time elapsed.

While in that, the graph fp denotes a chronological change in the number of pixels arranged in a prescribed position in a current image and a gray-level value of which are exceeding over the gray-level value of the respective pixels arranged in one and same position in a previous image but taken immediately before the current image had been taken, and the graph fm denotes a chronological change in the number of pixels arranged in a prescribed position in a current image and a gray-level value of which are below the gray-level value of the respective pixels arranged in one and same position in a previous image but taken immediately before the current image had been taken.

Further, the graph fa denotes a chronological change in the number of pixels the gray-level value of which exceeding over a predetermined threshold vale of gray-level value and which representing the number of pixels of the line pattern of the finger print image.

As shown in FIG. 10, at the time Td, the skin of the finger is just started to come into contacted with a surface of finger mounting plate of a fingerprint inputting apparatus and at this period, the contacting area of the finger with the finger mounting plate is relatively small but a difference formed between the number of pixels Pa of the current image and a gray-level value of which are increased from the gray-level value of the previous image taken immediately before the current image had been taken and the number of pixels Ma of the current image and a gray-level value of which are decreased from the gray-level value of the previous image taken immediately before the current image had been taken is relatively small.

In order to discriminate the condition under which the finger contacting area formed between the finger and the finger mounting plate is small from the condition under which the finger is stably mounted on the finger mounting plate, in the present invention, it is preferable to additionally utilize the number of pixels of the line pattern of the finger print image, which representing a size of the finger contacting area formed between the finger and the finger mounting plate.

As shown in FIG. 10, the graph fa shows the fact that just after when the finger has contacted to the finger mounting plate or just immediately before the finger has removed from the finger mounting plate, the finger contacting area formed between the finger and the finger mounting plate is small and thus the number of pixels of the line pattern of the finger print image is also small.

On the other hand, in other period, for example, from the time T1 to the time T2, the finger contacting area formed between the finger and the finger mounting plate is relatively large and the number of pixels of the line pattern of the finger print image is also large so as to exceed over a predetermined pixel number Pt.

Accordingly, a best mode of the present invention would be to use the characteristic in that when the finger has contacted to the finger mounting plate under a stable condition, a difference formed between the number of pixels Pa of the current image and a gray-level value of which are increased from the gray-level value of the previous image taken immediately before the current image had been taken and the number of pixels Ma of the current image and a gray-level value of which are decreased from the gray-level value of the previous image taken immediately before the current image had been taken is relatively small as well as the characteristic in that the number of pixels of the line pattern of the finger print image each having the gray-level value exceeding over a predetermined threshold vale of the gray-level value is large.

Specifically, either one of two image taken by the apparatus in successive period will be singled out therefrom at a timing at which the conditions such that the number of the pixels each having the gray-level value exceeding over a predetermined threshold value of the pixel number and a difference formed between the number of pixels Pa the gray-level value of which are increased and the number of pixels Ma the gray-level value of which are decreased is small, can be fulfilled.

In the above-mentioned explanation about the present invention, the example refers the specific embodiment in that two successive images taken by the apparatus in successive period were used.

However, in the present invention, in order to obtain further stable and more qualified fingerprint image, more than two images can be apparently used, for example, four successive images taken by the apparatus in successive period can also be used.

As shown in FIG. 11(A), when two successive finger print image data taken by the apparatus are used in one detecting operation, the fingerprint images f1, f2, f3, . . . each had been taken by the apparatus at the successive time period T11, T12, T13, . . . , as shown in FIG. 10, respectively, are used and at first, the fingerprint images f1 and f2 are compared to each other so as to decide whether or not the above-mentioned condition would be fulfilled and at the next step, the fingerprint images f2 and f3 are compared to each other so as to decide same.

And if the above-mentioned condition was fulfilled between the two fingerprint images f2 and f3, the period T13 is a timing at which the fingerprint image thus taken should be extracted as a best fingerprint image to be used for matching with the referenced fingerprint image data and either one of the fingerprint images f2 and f3 can be extracted as the selected fingerprint image.

On the other hand, as shown in FIG. 11(B), when four successive finger print image data taken by the apparatus of the are used in one detecting operation, the fingerprint images f1, f2, f3, f4 each had been taken by the apparatus at the successive time period T11, T12, T13, T14 as shown in FIG. 10, respectively, are used and at first, first two fingerprint images f1 and f2 are compared to each other so as to decide whether or not the above-mentioned condition would be fulfilled and a result thereof R1 would be come out and after that in the next two steps, the fingerprint images f2 and f3 and the the fingerprint images f3 and f4 are compared to each other, respectively, and the result thereof R2 and R3 would be come out, respectively.

And if at least two results thereof among three results would fulfil the above-mentioned conditions, it can be decided that the finger has been stably mounted on the finger mounting plate and any one of the fingerprint images f1, f2, f3, f4 can be extracted, otherwise no fingerprint images f1, f2, f3, f4 can be extracted and go to the next image taking operation.

One embodiment for deciding whether or not the above-mentioned condition would be fulfilled in the present invention will be explained hereunder with reference to FIG. 12.

Note that the fingerprint images f1, f2, f3 each had been taken by the apparatus at the successive time period T11, T12, T13, as shown in FIG. 10, respectively, and each fingerprint images f1, f2, f3 having four pixels P1, P2, P3 and P4 arrange on the same position in each one of the fingerprint images f1, f2, f3 and each pixel having the gray-level value as shown in the respective images, as shown in the FIG. 12.

And in this example, a threshold value of the pixel number each of which having a gray-level value exceeding over a predetermined threshold value is set at 3 pixels and the predetermined threshold value of the gray-level value is set at 4.

In this example, at the first step, the fingerprint images f1 and f2 are compared to each other and it is figured out that the fingerprint image f2 has the number of pixels, a gray-level value of which are increased from that of the same pixels in the fingerprint images f1, is 2 while the number of pixels, a gray-level value of which are decreased from that of the same pixels in the fingerprint images f1 is also 2 and the number of pixels having the gray-level value exceeding over the predetermined threshold value of the gray-level value 4, is 2.

Accordingly, the fingerprint image f2 cannot fulfill the above-mentioned condition and thus the period at which the fingerprint image f2 had been taken is not a good timing and therefore the fingerprint image f2 should not be extracted as a pertinent fingerprint image.

Then in the next step, the fingerprint images f2 and f3 are compared to each other and it is figured out that the fingerprint image f3 has the number of pixels, a gray-level value of which are increased from that of the same pixels in the fingerprint images f2, is 1 while the number of pixels, a gray-level value of which are decreased from that of the same pixels in the fingerprint images f2 is 2 and the number of pixels having the gray-level value exceeding over the predetermined threshold value of the gray-level value 4, is 3.

Accordingly, the fingerprint image f3 can fulfill the above-mentioned condition and thus the period at which the fingerprint image f3 had been taken is a good timing and therefore the fingerprint image f3 should be extracted as a pertinent fingerprint image.

In this situation, the fingerprint image f2 had been taken is a good timing and therefore the fingerprint image f3 can also be extracted as a pertinent fingerprint image, instead.

As mentioned above, the image pick-up apparatus according to the invention for automatically picking up a plurality of time-series images to provide a digital image gives an effect that by obtaining the information of changes in gray-level of each of a plurality of images and determining, based on the obtaining results, their pick-up timing points, it is possible to automatically pick up images, appropriate for fingerprint recognition, of fingerprint images input from an input unit, even when there is rather a large fluctuation in their gray-level distribution or the size of their line pattern of the finger print.

What is claimed is:

1. An image pick-up apparatus for picking up a plurality of images being chronologically arranged along time-series to provide an image, comprising:
   a means for obtaining information about changes in gray level value between said plurality of images; and
   a means for determining a timing for selecting at least one of said plurality of picked up images,
   wherein said selection is based on a result from said obtained information,
   wherein said means for obtaining information compares said gray level value of pixels in an image of said plurality of images with similarly positioned pixels in another image of said plurality of images, and obtains a number of pixels whose said gray-level value has increased and a number of pixels whose said gray-level value has decreased, and
   wherein said means for determining a timing determines a timing for extracting one image from said plurality of images, when said number of pixels with increase in said gray-level value is less than the number of pixels with decrease in said gray level value.

2. The image pick-up apparatus according to claim 1, wherein,
   said image information obtaining means for each image in said plurality of images obtains a number of pixels whose said gray-level value exceeds a predetermined gray-level threshold value; and
   said timing determining means determines said timing for extracting said one image, when said number of pixels of the one image with said gray-level value above the gray-level threshold value exceeds a predetermined pixel number threshold.

3. An image pick-up apparatus for picking up a plurality of images being chronologically arranged along time-series to provide an image, comprising:
   a means for obtaining information about changes in gray level value between said plurality of images; and
   a means for determining a timing for selecting at least one of said plurality of picked up images,
   wherein said selection is based on a result from said obtained information,
   wherein said means for obtaining information compares said gray level value of pixels in an image of said plurality of images with similarly positioned pixels in another image of said plurality of images, and obtains a number of pixels whose said gray-level value has increased and a number of pixels whose said gray-level value has decreased, and
   wherein said means for determining a timing determines a timing for extracting one image from said plurality of images when a predetermined threshold value of pixel numbers is greater than an absolute value of a difference between said number of pixels with increase in said gray-level value and the number of pixels with decrease in said gray-level value.

4. An image pick-up apparatus for picking up a plurality of images being chronologically arranged along time-series to provide an image, comprising:
   a means for obtaining information about changes in gray level value between said plurality of images; and
   a means for determining a timing for selecting at least one of said plurality of picked up images,
   wherein said selection is based on a result from said obtained information,
   wherein said means for obtaining information compares said gray level value of pixels in an image of said plurality of images with similarly positioned pixels in another image of said plurality of images, and obtains a number of pixels whose said gray-level value has increased and a number of pixels whose said gray-level value has decreased,
   wherein said image information obtaining means for each image in said plurality of images obtains a number of pixels with said gray level value exceeding a predetermined gray level threshold value, and
   wherein said timing determining means determines said timing for extracting one image from said plurality of images, when said number of pixels with said gray-level value exceeding said predetermined gray level threshold value outnumbers a predetermined pixel numbers threshold, and further when an absolute value of a difference between said number of pixels with increase in said gray-level value and the number of pixels with decrease in said gray-level value is less than a second predetermined pixel number threshold.

5. An image pick-up apparatus for picking up a plurality of images being chronologically arranged along time-series to provide an image, comprising:
   a means for obtaining information about changes in gray level value between said plurality of images; and
   a means for determining a timing for selecting at least one of said plurality of picked up images,
   wherein said selection is based on a result from said obtained information,
   wherein said means for obtaining information compares said gray level value of pixels in an image of said plurality of images with similarly positioned pixels in another image of said plurality of images, and obtains a number of pixels whose said gray-level value has increased and a number of pixels whose said gray-level value has decreased,
   wherein said plurality of images comprises at least two successive images which had been successively picked up by said image pick-up apparatus,
   wherein a first image from said at least two successive images is a first frame and a second image from said at least two images is a second frame, and
   wherein said apparatus further comprises:
      an image picking up means for picking up images;
      a memory means for storing said images; comprising first memory means and second memory means for said plurality of images, and
      a data processing means comprising: a pixel comparing means, a pixel number counting means for counting a number of said pixels whose gray level value has changed, and said timing determining means, and
      an output means.

6. The image pick-up apparatus according to claim 5, wherein said first frame is stored in said first memory means and said second frame picked up immediately after said first frame is stored in said second memory means.

7. The image pick-up apparatus according to claim 5, wherein said pixel comparing means compares a gray level value of each pixel in said first frame with a gray level value of each pixel in said second frame pixel corresponding to said each pixel in said first frame.

8. An image pick-up method for picking up a plurality of images being chronologically arranged along time-series to provide an image, comprising:
   obtaining information about changes in gray level value between said plurality of images; and
   deciding a timing at which at least one of said plurality of picked up images is selected,
   wherein said selection is based upon on a result from said obtained information,
   wherein obtaining said information further comprises:
      comparing said gray level value of pixels in one image from said plurality of images with similarly positioned pixels of another from said plurality of images, and
      obtaining a number of pixels in said one image whose said gray-level value has increased and a number of pixels in said one image whose said gray-level value has decreased, and
   wherein determining a timing for extracting at least one image from said plurality of images is based on when said number of pixels with increase in said gray-level value is less than the number of pixels with decrease in said gray-level value.

9. An image pick-up method for picking up a plurality of images being chronologically arranged along time-series to provide an image, comprising:
   obtaining information about changes in gray level value between said plurality of images; and
   deciding a timing at which at least one of said plurality of picked up images is selected,
   wherein said selection is based upon on a result from said obtained information,
   wherein obtaining said information further comprises:
      comparing said gray level value of pixels in one image from said plurality of images with similarly positioned pixels of another from said plurality of images, and
      obtaining a number of pixels in said one image whose said gray-level value has increased and a number of pixels in said one image whose said gray-level value has decreased, and
   wherein determining a timing for extracting an image is based on a predetermined threshold value of pixel numbers being greater than an absolute value of a difference between said number of pixels with increase in said gray-level value and the number of pixels with decrease in said gray-level value.

10. An image pick-up method for picking up a plurality of images being chronologically arranged along time-series to provide an image, comprising:
   obtaining information about changes in gray level value between said plurality of images; and
   deciding a timing at which at least one of said plurality of picked up images is selected,
   wherein said selection is based upon on a result from said obtained information, and
   wherein:
      said step of obtaining said information obtains a number of pixels of an image of said plurality of images having said gray-level value exceeding a predetermined gray level threshold value; and
      said step of deciding a timing for extracting one image decides a timing where said number of pixels with said gray-level value exceeding said predetermined gray level threshold value outnumbers a predetermined threshold value of pixel numbers, and further where said number of pixels with increase in said gray-level value is less than the number of pixels with decrease in said gray-level value.

11. An image pick-up method for picking up a plurality of images being chronologically arranged along time-series to provide an image, comprising:
   obtaining information about changes in gray level value between said plurality of images; and
   deciding a timing at which at least one of said plurality of picked up images is selected,
   wherein said selection is based upon on a result from said obtained information, and
   wherein:
      said step of obtaining information obtains a number of pixels in an image from said plurality of images, with said gray-level value exceeding a predetermined gray level threshold value; and
      said step of determining a timing determines said timing when said number of pixels with said gray-level value exceeding a predetermined gray level threshold value outnumbers a predetermined threshold value of pixel numbers, and further when an absolute value of a difference between said number of pixels with increase in said gray-level value and the number of pixels with decrease in said gray-level value is less than a second predetermined pixel number threshold.

12. An image pick-up method for picking up a plurality of images being chronologically arranged along time-series to provide an image, comprising:

obtaining information about changes in gray level value between said plurality of images; and deciding a timing at which at least one of said plurality of picked up images is selected, wherein said selection is based upon on a result from said obtained information, and wherein said method further comprises:

picking up said plurality of images with an image picking up means;

storing said images by storing said first frame image data from said at least two successive images into a first memory means and storing said second frame image data from said at least two successive images into a second memory means;

comparing and counting number of pixels with a change in gray level value by using data processing means; and determining a timing to extract at least one suitable image for image processing, and outputting said at least one suitable image.

* * * * *